United States Patent [19]

Hayashi et al.

[11] Patent Number: 4,529,412
[45] Date of Patent: Jul. 16, 1985

[54] PROCESS FOR OBTAINING HIGH CONCENTRATION ARGON BY PRESSURE-SWING-ADSORPTION

[75] Inventors: Saburo Hayashi; Hiroo Tsuchiya; Kazuo Haruna, all of Kakogawa, Japan

[73] Assignee: Seitetsu Kagaku Co., Ltd., Hyogo, Japan

[21] Appl. No.: 552,895

[22] Filed: Nov. 17, 1983

[30] Foreign Application Priority Data

Nov. 19, 1982 [JP] Japan .................. 57-203853

[51] Int. Cl.³ .......................... B01D 53/04
[52] U.S. Cl. .......................... 55/25; 55/58; 55/66; 55/68; 55/75
[58] Field of Search ............ 55/25, 26, 58, 62, 66, 55/68, 75

[56] References Cited

U.S. PATENT DOCUMENTS

| | | | |
|---|---|---|---|
| 2,944,627 | 7/1960 | Skarstrom | 55/58 X |
| 3,037,338 | 6/1962 | Thomas | 55/58 |
| 3,155,468 | 11/1964 | de Montgareuil et al. | 55/58 X |
| 3,237,377 | 3/1966 | Skarstrom | 55/58 X |
| 3,242,645 | 3/1966 | de Montgareuil et al. | 55/58 |
| 3,338,030 | 8/1967 | Feldbauer, Jr. | 55/58 X |
| 3,898,047 | 8/1975 | Cramer | 55/26 X |
| 3,923,477 | 12/1975 | Armond et al. | 55/58 X |
| 3,957,463 | 5/1976 | Drissel et al. | 55/58 X |
| 3,960,522 | 6/1976 | Munzner et al. | 55/68 |
| 3,996,028 | 12/1976 | Golovko et al. | 55/66 X |
| 4,144,038 | 3/1979 | Armond | 55/66 X |
| 4,190,424 | 2/1980 | Armond et al. | 55/58 |
| 4,239,509 | 12/1980 | Bligh et al. | 55/66 |
| 4,256,469 | 3/1981 | Leitgeb | 55/68 X |

FOREIGN PATENT DOCUMENTS 515010 3/1981 Australia .

Primary Examiner—Robert Spitzer
Attorney, Agent, or Firm—Pollock, Vande Sande & Priddy

[57] ABSTRACT

A process for obtaining high concentration argon from air by means of pressure-swing-adsorption, characterized by passing air through a zeolite molecular sieve-packed adsorption apparatus and a carbon molecular sieve-packed adsorption apparatus in this order, subjecting the air to pressure-swing-adsorption operation independently in the above pieces of adsorption apparatus, thereby obtaining concentrated argon and high purity oxygen simultaneously.

9 Claims, 7 Drawing Figures

FIRST STAGE PSA SEQUENCE

| VALVE NO. | 60 SEC. | 60 SEC. | 60 SEC. |
|---|---|---|---|
| 1 | ■ | | |
| 2 | | ■ | |
| 3 | | | ■ |
| 4 | | ■ | |
| 5 | | | ■ |
| 6 | ■ | | |
| 7 | ■ | | |
| 8 | | ■ | |
| 9 | | | |
| 10 | | | ■ |
| 11 | ■ | | |
| 12 | | ■ | |
| 13 | ■ | ■ | ■ |
| 14 | ■ | ■ | ■ |
| COLUMN I | ADSORPTION | DESORPTION | PRESSURE RESTORATION BY PRODUCT GAS |
| COLUMN II | PRESSURE RESTORATION BY PRODUCT GAS | ADSORPTION | DESORPTION |
| COLUMN III | DESORPTION | PRESSURE RESTORATION BY PRODUCT GAS | ADSORPTION |

NOTE:  OPEN

☐ SHUT

FOURTH AND FIFTH STAGE PSA SEQUENCE

PROCESS FOR OBTAINING HIGH CONCENTRATION ARGON BY PRESSURE-SWING-ADSORPTION

The present invention relates to a process for obtaining high concentration argon from air by pressure-swing-adsorption (hereinafter abbreviated to PSA).

Argon is known as an inert gas and utilized for electric appliances, welding, degassing in steel production, etc.

Conventionally, argon has been obtained from air by a cryogenic air separation plant. In this case, crude argon is obtained by rectifying liquid air in a main rectification column in a liquid oxygen-producing plant, withdrawing, among the resulting oxygen fractions, a fraction having a high argon concentration, and further rectifying the fraction. Further, from the crude argon, high purity argon is obtained by introducing hydrogen gas from a hydrogen bomb into the crude argon, passing the resulting gas mixture through oxygen-removing apparatus packed with a catalyst such as palladium or the like to remove oxygen, and passing the oxygen-removed gas again through a rectification column.

Argon is chemically inactive and moreover very similar to oxygen in physical properties as shown in Table 1. Therefore, it is difficult to separate argon from oxygen, and its rectification requires a large number of plates.

TABLE 1

| Physical Constants of Gas Molecules | | | |
|---|---|---|---|
| Physical properties | Argon | Nitrogen | Oxygen |
| Density (g/l.) | 1.7834 | 1.2507 | 1.4289 |
| Specific gravity (air = 1) | 1.38 | — | 1.1053 |
| Melting point (°C.) | −189.2 | −209.8 | −218.4 |
| Boiling point (°C.) | −185.7 | −195.8 | −182.9 |
| Molecule diameter | | | |
| Length (Å) | 3.84 | 4.1 | 3.9 |
| Width (Å) | — | 3.0 | 2.8 |
| Van der Waals constants | | | |
| a ($10^6 cm^6 mol^{-2}$) | 1.35 | 1.39 | 1.36 |
| b ($cm^3 mol^{-1}$) | 32.3 | 39.2 | 31.9 |
| Critical constants | | | |
| $t_c$ (°C.) | −122.4 | −47.0 | −118.5 |
| $p_c$ (atm) | 48.1 | 33.5 | 49.7 |
| $D_c$ (g·$cm^{-3}$) | 0.533 | 0.313 | 0.436 |

Processes for separating argon by use of an adsorbent have been proposed. For example, Australian Pat. No. 515,010 describes a process for obtaining argon from a gas mixture comprising argon, oxygen and nitrogen, which comprises introducing this gas mixture into a column packed with two kinds of adsorbents A and B having different adsorptivities toward oxygen and nitrogen and subjecting the gas mixture to repeated PSA operation therein to obtain argon having at least a chosen purity. In this process, it is intended that the two kinds of adsorbents adsorb oxygen and nitrogen, respectively, whereby the argon concentration is increased. This is a process in which different adsorption capacities of two adsorbents toward nitrogen, oxygen and argon are utilized, and nitrogen and oxygen in air are successively adsorbed to separate argon.

In this process, two different adsorbents are packed in a single adsorption column. Hence, it is difficult to make the conditions inside the column optimum for the respective adsorbents, and accordingly, high purity argon cannot be obtained. More specifically, if the conditions inside the column is made optimum for either the adsorbent A or B, for example, optimum for oxygen-adsorption, oxygen is adsorbed but nitrogen is not sufficiently adsorbed because the conditions are not optimum for the other adsorbent. In this case, it follows that the argon obtained contains a considerable amount of nitrogen. Thus, satisfactory operation cannot be conducted. The specification of the above Australian patent does not mention any specific purity of argon obtained, but in such a process, the purity of argon recovered will be not more than 50%.

In view of the above situation, the present inventors have made extensive research on adsorption characteristics of various adsorbents. As a result, it has been found that a carbon molecular sieve whose micro pore diameters have the highest distribution at 3 Å and a zeolite molecular sieve whose micro pore diameters have the highest distribution at 5 Å have different adsorption characteristics at an early stage of adsorption, for example, the carbon molecular sieve, when subjected to adsorption operation for few minutes or more, loses its adsorption-selectivity. That is, it has been found that, when said carbon molecular sieve and said zeolite molecular sieve are packed in one and same adsorption column or one and same mechanism and PSA is conducted, the respective adsorption characteristics cannot be sufficiently utilized. Because said carbon molecular sieve has an adsorption characteristic that in long time adsorption, the molecular sieve adsorb nitrogen and oxygen in equal volumes but at an early stage of adsorption oxygen diffuses into micro pores faster than nitrogen does, it is absolutely necessary for adsorption of oxygen by use of the carbon molecular sieve that separation is conducted by utilizing the above difference in adsorption rate between oxygen and nitrogen, that is, by adopting an adsorption time as short as 1 to 2 min. or less including pressure equalization cycle.

On the other hand, said zeolite molecular sieve has the characteristic that nitrogen is preferentially adsorbed and the nitrogen-adsorption ability thereof has no relation to the adsorption time. In the present invention, in order that the difference in characteristics between the above two adsorbents is effectively utilized, one and the same adsorption column is not packed with the two adsorbents, and each independent PSA apparatus is packed with only one kind of adsorbent, and nitrogen and oxygen are separated and removed stepwise under the optimum operating conditions for the respective adsorbents, whereby argon is obtained.

According to the present invention, there is provided a process for selectively obtaining argon and oxygen by a PSA method from the starting gas comprising oxygen as the major component and at least 3% of argon, characterized by subjecting said starting gas to a PSA operation in a carbon molecular sieve-packed adsorption apparatus to obtain concentrated argon and at the same time high concentration oxygen. Preferably, there is provided a process for obtaining high concentration argon from air as the starting gas by a PSA method, characterized by introducing air into a zeolite molecular sieve-packed adsorption apparatus and then into a carbon molecular sieve-packed adsorption apparatus and subjecting air to a PSA operation independently in each thereof to obtain concentrated argon and high concentration oxygen simultaneously.

The present invention will be explained specifically with reference to the accompanying drawings.

In FIGS. 1 and 3,

Figure 1:
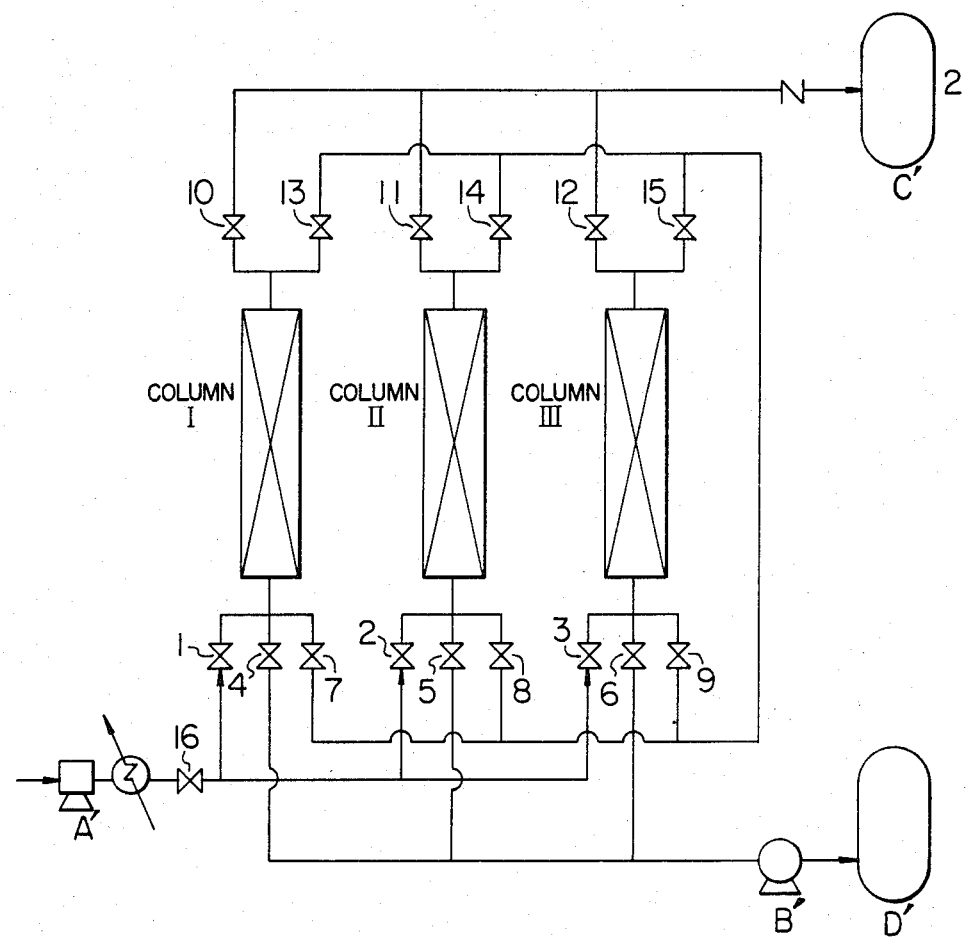
FIG. 1 shows a diagramatic representation of apparatus for carrying out the process of the present invention.

| A' | Compressor | I | Vacuum pump |
|---|---|---|---|
| A | Air blower | J | Buffer tank |
| B' | Vacuum pump | K | Secondary argon tank |
| B | Vacuum pump | L | Hydrogen bomb |
| C' | Primary argon tank | M | Oxygen-removing Apparatus |
| C | Crude oxygen tank | | |
| D' | High concentration oxygen tank | N | Cooler |
| | | O | High concentration argon tank |
| D | Gas compressor | P | Vacuum pump |
| E | Cooler | Q | Cooler |
| F | Vacuum pump | R | Buffer tank |
| G | High concentration oxygen tank | S | Recovered argon tank |
| H | Primary argon tank | T | Vacuum pump |

An outline of a typical embodiment of the present invention will be stated hereunder. The first-stage PSA apparatus is packed with a zeolite molecular sieve having a function of selectively adsorbing nitrogen. Air as the starting material is supplied thereto and subjected to a PSA operation to obtain a gas comprising, for example, 94% of oxygen, 1% of nitrogen and 5% of argon. The second-stage PSA apparatus is packed with a carbon molecular sieve having a function of selectively adsorbing oxygen. The gas thus obtained is fed thereto and subjected to a PSA operation for a short time, whereby oxygen is adsorbed and argon is concentrated to about 40% (nitrogen about 8%) as primary argon. At this stage, an oxygen gas having an oxygen concentration higher than that of the fed gas, namely, an oxygen concentration of about 97%, is obtained as a desorbed gas, and these two stages contribute also to increasing the oxygen concentration of the starting gas. This is an effect of packing each adsorbent in independent PSA apparatus and subjecting independently each apparatus to a different PSA operation, and such a result cannot be obtained, when the above two adsorbents are together packed in one and the same apparatus and the starting gas is introduced into the above two adsorbents to be subjected to PSA operation in the apparatus. Further, the third stage PSA apparatus is packed with the same carbon molecular sieve, and in this apparatus, the primary argon gas is subjected to PSA operation in the same manner as in the second-stage PSA apparatus, whereby oxygen is removed by adsorption and argon is concentrated to 85% as secondary argon. During this operation, nitrogen is also concentrated with substantially the same composition ratio to argon (8:40). Because the ratio of argon to nitrogen is not varied, and therefore, in order to further reduce the nitrogen content, another purification method is required. By the two-stage PSA operation, the oxygen concentration is reduced down to several percent. However, in order to completely remove oxygen, two moles of hydrogen per mole of oxygen, should be added to the secondary argon gas. Then, the hydrogen-added secondary argon gas is treated with a palladium-supporting deoxygenating catalyst, whereby oxygen is removed in the form of water. The aforementioned second-stage PSA apparatus may be a multicolumn type apparatus containing at least two columns. But in the case of apparatus containing four or more columns, the argon yield is not increased in proportion to an increase of apparatus cost and in the case of a two-column type apparatus, the argon yield is decreased. Hence, a three-column type apparatus is most advantageous. A flow sheet for the second-stage PSA apparatus containing three columns is shown in FIG. 1, and the operational sequence of the apparatus is shown in FIG. 2.

Figure 2:
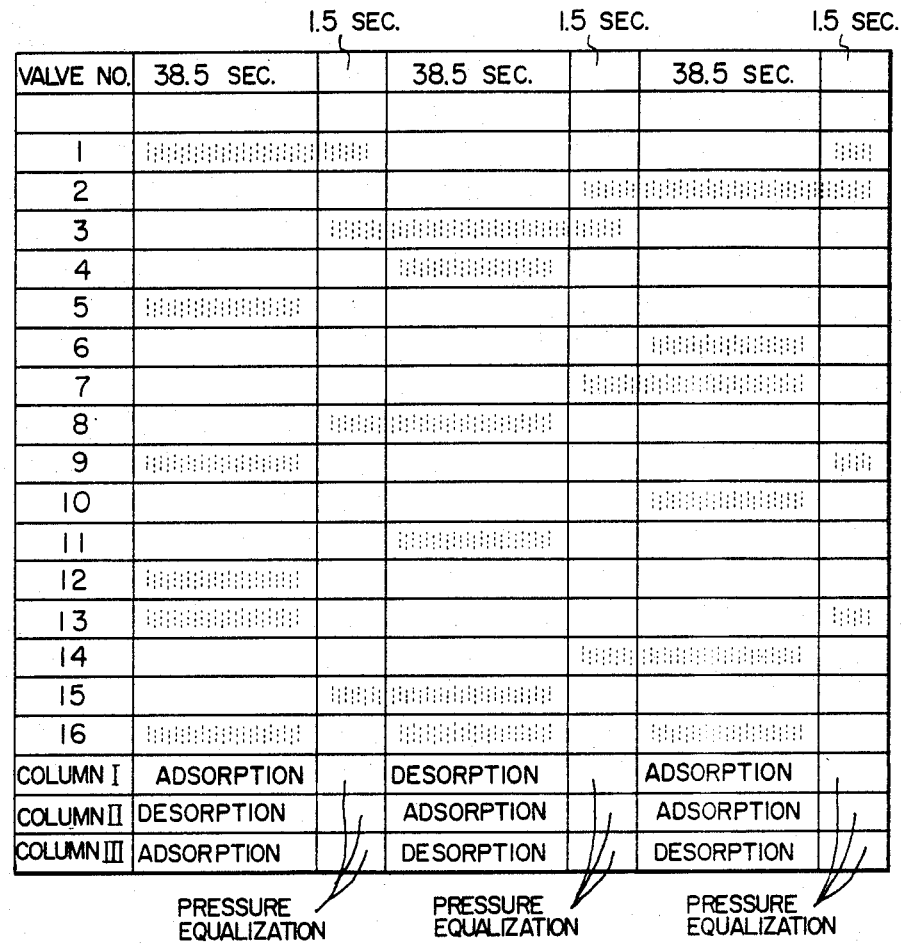
FIG. 2 shows the sequence and time cycle in the apparatus of FIG. 1.

In FIG. 1, adsorption columns I, II, III are packed with a carbon molecular sieve of 3 Å pore diameter. Crude oxygen (oxygen: 94.5%, argon: 4.5%, nitrogen: 1%, 3 kg/cm$^2$) is introduced into column I through a compressor A', where oxygen is adsorbed. The resulting gas is stored in a primary argon tank C'. The adsorbed oxygen is desorbed and stored in a high purity oxygen tank D' through a vacuum pump B'. This procedure is conducted by sequentially opening and shutting valves 1 to 16 as shown in FIG. 2.

The third-stage PSA apparatus contains two columns, and PSA operation is conducted by the sequential five steps of adsorption, pressure equalization, desorption, pressure equalization, and pressurization by starting gas. The desorbed gas from the third-stage PSA apparatus is recycled to the feed gas of the second-stage PSA apparatus to recover argon.

After the operation in the third-stage PSA apparatus, oxygen is removed by adding hydrogen, in the same manner as explained above.

When the required argon purity is 99% or more, the product gas of the third-stage PSA apparatus is sent to the fourth-stage PSA apparatus packed with zeolite molecular sieve to adsorb and remove nitrogen. It is possible that the desorbed gas from the fourth-stage PSA apparatus is sent to the fifth-stage PSA apparatus packed with zeolite molecular sieve to adsorb nitrogen and recover argon, and the recovered argon is recycled to the feed gas of the fourth-stage PSA apparatus. The desorbed gas from the fifth-stage PSA apparatus is a gas comprising nitrogen as major component and argon, and is utilized as an inert gas.

It is also possible that, in place of the above fifth-stage PSA apparatus, a cryogenic air separation plant is used to obtain high purity argon.

The above described operation can be summarized as follows:

Using air as the starting gas, crude oxygen is obtained in the first-stage PSA apparatus. In the second-stage PSA apparatus, an oxygen product having an oxygen concentration of 95% or more and primary argon gas are simultaneously obtained. The primary argon gas is concentrated in the third-stage PSA apparatus to obtain a secondary argon gas containing a slight amount of oxygen. The desorbed gas from the third-stage PSA apparatus is recycled to the feed gas of the second-stage PSA apparatus. The small amount of oxygen in the secondary argon gas is removed by hydrogen-reduction in the oxygen-removing apparatus. The resulting argon free from oxygen is treated in the fourth-stage PSA apparatus to adsorb and remove nitrogen, whereby high purity argon of at least 99% concentration is obtained. The desorbed gas from the fourth-stage PSA apparatus is introduced into the fifth-stage PSA apparatus to recover argon. This recovered argon is recycled to be mixed with the feed gas of the fourth-stage PSA apparatus. The desorbed gas from the fifth-stage PSA apparatus is rich in nitrogen and utilized as an inert gas. The over all yield of high purity argon is 40% or more, as more than 99% purity argon, based on the argon in the crude oxygen product.

When, as the starting gas, the crude oxygen containing 4.5% of argon is replaced by a gas mixture containing about 12% of argon, which is withdrawn from the rectification column of a cryogenic air separation plant, operations of the second-stage PSA apparatus and the later-stage PSA apparatus can be conducted more efficiently. This process is also included in the scope of the present invention.

The zeolite molecular sieve used in the present invention has preferably a micro pore diameter having the highest distribution at 5 Å. The carbon molecular sieve used in the present invention has preferably a micro pore diameter showing the highest distribution at 3 Å. The adsorption pressure is preferably within the range of 0.3 to 10 kg/cm$^2$G, more preferably 1 to 3 kg/cm$^2$G, from the economical viewpoint. With respect to the desorption pressure, a lower desorption pressure gives a better efficiency. Ordinarily, desorption is operated at the pressure of 400 Torr or less, preferably of 200 Torr or less. Theoretically, the efficiency is higher when adsorption is operated at a lower temperature and desorption is done at a higher temperature, in view of the adsorption capacity. However, since the PSA operation is conducted adiabatically and the heat of adsorption (exothermic) is consumed as a heat of desorption (endothermic), the PSA operation is effectively operated at the normal temperature.

The high purity argon referred to in the present invention means argon of at least 98% concentration. It is possible to obtain, in the present invention, high purity argon having at least 99.9% concentration such as welding argon specified by JIS, but the yield of such high purity argon is low. For applications such as degassing in steel production, argon of about 98% concentration is sufficient, and therefore, the present process is effective for such applications, particularly from the economical standpoint. In the present invention, each of the second-stage PSA apparatus and the third-stage PSA apparatus may consist of one adsorption column, but it is desirable that ordinarily each stage-PSA apparatus has a plurality of adsorption columns and a sequential operation of adsorption, pressure equalization, desorption, pressure equalization, and pressurization by starting gas (or pressurization by product gas) which is operated by sequentially opening and shutting valves.

In the PSA operation, there is a correlation between the composition and the yield of a product gas. If the purity of the product gas is raised, the yield is decreased. Therefore, operation conditions such as adsorption pressure, desorption pressure, cycle time and the like should be selected in compliance with the desired product purity.

Hereinafter, the present invention will be explained in more detail referring to Examples, but is not restricted to the Examples.

EXAMPLE 1

A mixed gas composed of 4.5% of argon, 93.6% of oxygen and 1.9% of nitrogen was supplied to the first carbon molecular sieve-packed PSA apparatus shown in .FIG. 1 comprising three adsorption columns each having a size of 40 mm D×500 mm H and being packed with a carbon molecular sieve adsorbent having a micro pore diameter of 3 Å, and PSA was operated in the apparatus. The maximum adsorption pressure was 2.0 kg/cm$^2$G and the desorption pressure was 150 Torr. The cycle time was, as shown in FIG. 2, 38.5 sec for adsorption, 38.5 sec for desorption, and 1.5 sec for pressure equalization (a total time of one cycle: 120 sec). When the product was withdrawn at a rate of 0.8 Nl./min, the argon product consisted of 33.0% of argon, 52.3% of oxygen and 14.7% of nitrogen. The yield of argon was 69%. The desorbed gas (oxygen product) consisted of 1.5% of argon, 97.9% of oxygen and 0.5% of nitrogen. The yield of oxygen was 94.7%.

EXAMPLE 2

The starting gas which had the same composition as the product gas obtained in Example 1 was introduced into the second carbon molecular sieve-packed PSA apparatus. The PSA apparatus had two adsorption columns each having a size of 40 mm D×500 mm H and being packed with a carbon molecular sieve. The starting gas consisted of 35.5% of argon, 50% of oxygen and 14.5% of nitrogen. The maximum adsorption pressure was 1.0 kg/cm$^2$G and the desorption pressure was 100 Torr. the cycle time was 45 sec for adsorption, 48.5 sec for desorption, 1.5 sec for pressure equalization and 3.5 sec for pressurization by starting gas (a total time of one cycle: 100 sec). When the product was withdrawn at a rate of 1.0 Nl./min, that consisted of 71.1% of argon, 2.67% of oxygen and 26.2% of nitrogen. The argon yield was 53%. The desorbed gas consisted of 22.7% of argon, 66.7% of oxygen and 10.6% of nitrogen.

EXAMPLE 3

The desorbed gas obtained by the PSA operation in Example 2 was recycled into the starting gas of the first carbon molecular sieve-packed PSA apparatus of Example 1. The first carbon molecular sieve-packed PSA apparatus in Example 1 was composed of three adsorption columns, and the second carbon molecular sieve-packed PSA apparatus in Example 2 was composed of two adsorption columns. The maximum adsorption pressure was 2 kg/cm$^2$G. The desorption pressure of the first carbon molecular sieve-packed adsorption apparatus was 150 Torr and that of the second carbon molecular sieve-packed adsorption apparatus was 100 Torr. The starting gas was a product gas consisting of 4.35% of argon, 93.5% of oxygen and 2.15% of nitrogen from a zeolite molecular sieve-packed PSA apparatus. The product gas from the second carbon molecular sieve-packed PSA apparatus consisted of 71.8% of argon, 2.5% of oxygen and 25.6% of nitrogen. The argon yield was 56%. The desorbed gas (oxygen product) from the first carbon molecular sieve-packed PSA apparatus consisted of 2.0% of argon, 96.6% of oxygen and 1.3% of nitrogen. The oxygen yield was 99.9%.

EXAMPLE 4

The product gas from the second carbon molecular sieve-packed PSA apparatus in Example 3 was subjected to deoxygenation in an oxygen-removing apparatus and then to PSA operation in the first zeolite molecular sieve-packed PSA apparatus in order to remove nitrogen, and to obtain argon. The desorbed gas from the first zeolite molecular sieve-packed PSA apparatus was subjected to PSA operation in the second zeolite molecular sieve-packed PSA apparatus to further remove nitrogen and recover argon by removing nitrogen. The desorbed gas from the second zeolite molecular sieve-packed PSA apparatus was recycled to the feed line of the first zeolite molecular sieve-packed PSA apparatus. Each of the first zeolite molecular sieve-packed PSA apparatus and the second zeolite molecular sieve-packed PSA apparatus was composed of three adsorption columns. The desorption step was followed by a pressurization by the product gas, namely, a step of charging these columns with a product gas. The same cycle time was used for the first PSA apparatus and the second PSA apparatus, and it was 60 sec for adsorption, 50 sec for desorption, 10 sec for pressure equalization and 50 sec for pressure restoration by product gas. The adsorption pressure of the first zeolite molecular sieve-packed PSA apparatus was 0.5 kg/cm$^2$G and the desorption pressure was 50 Torr. The mixture of the inlet gas of the first zeolite molecular sieve-packed PSA apparatus and the product gas (recycle gas) from the second zeolite molecular sieve-packed PSA apparatus consisted of 78.1% of argon and 21.9% of nitrogen. The product argon had a purity of 99%. The argon yield of the first zeolite molecular sieve-packed PSA apparatus was 55% and the argon yield obtained when the first zeolite molecular sieve-packed PSA apparatus was combined with the second carbon molecular sieve-packed PSA apparatus was 79.8%. The desorbed gas from the second zeolite molecular sieve-packed PSA apparatus consisted of 36.4% of argon and 63.6% of nitrogen. Incidentally, the adsorption pressure of the second zeolite molecular sieve-packed PSA apparatus, was 1.2 kg/cm$^2$G and the desorption pressure was 50 Torr.

EXAMPLE 5

Figure 3:
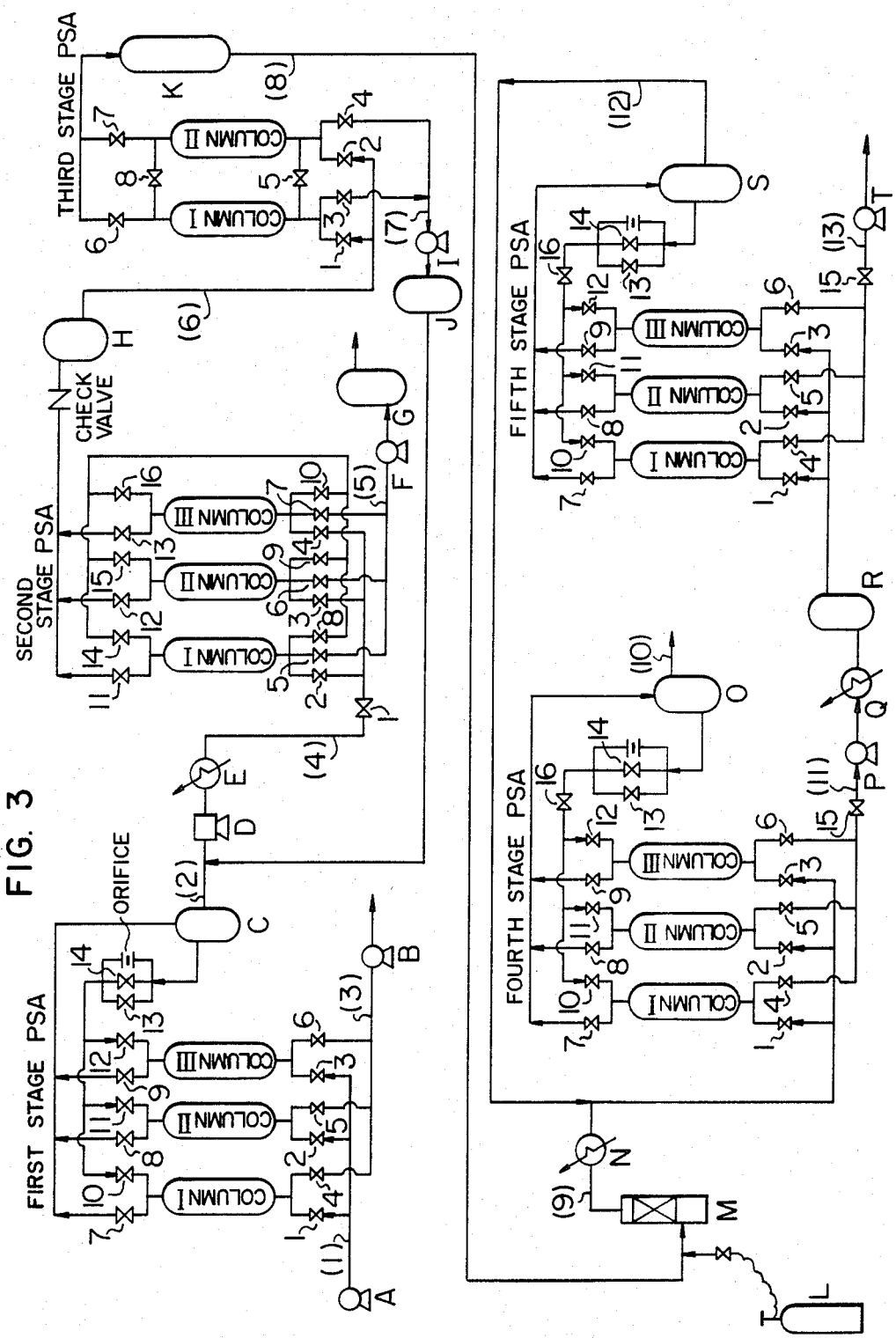
FIG. 3 shows a diagramatic representation of another apparatus for carrying out the process of the present invention.
Figure 4:
FIGS. 4 to 7 show the sequences and time cycles in the apparatus of FIG. 3.
Figure 5:
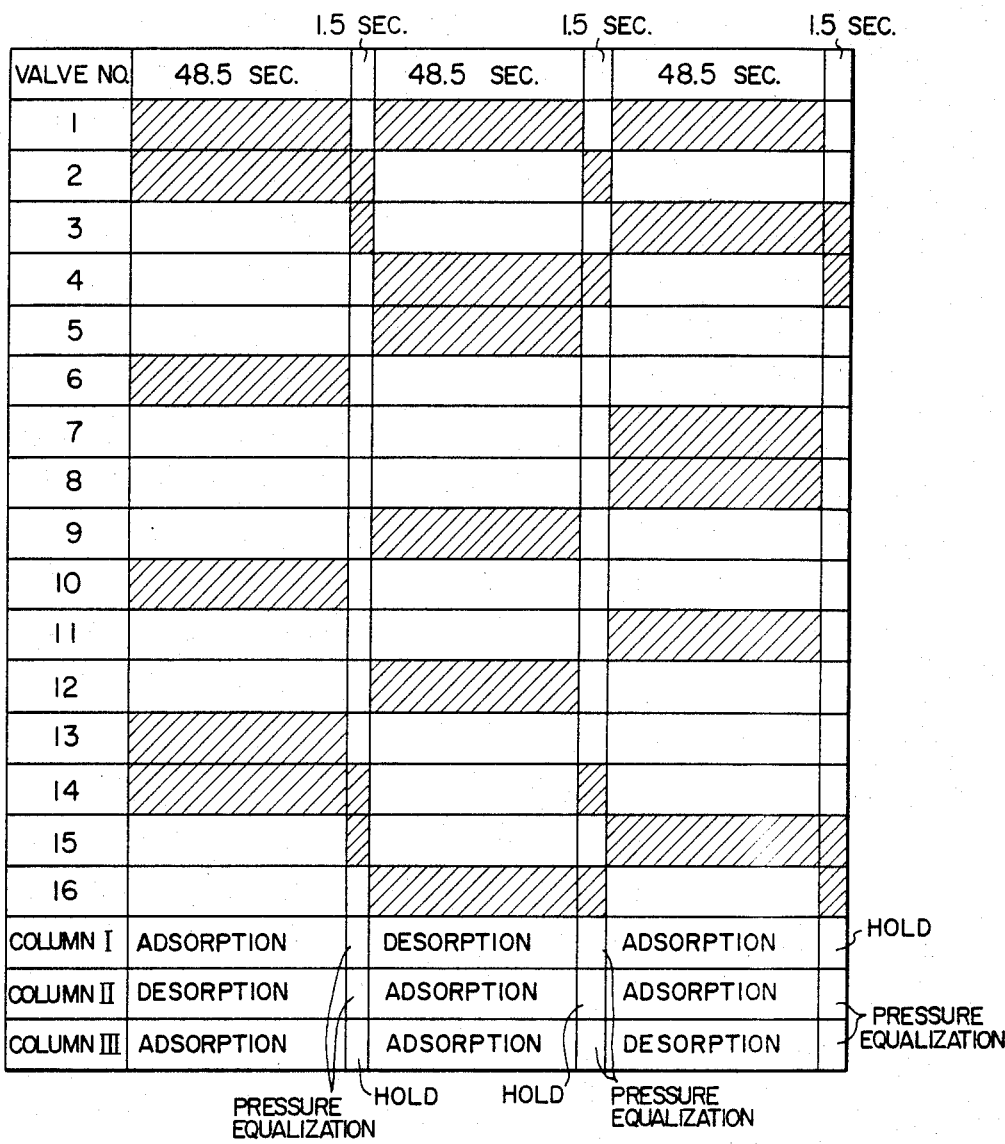
Figure 6:
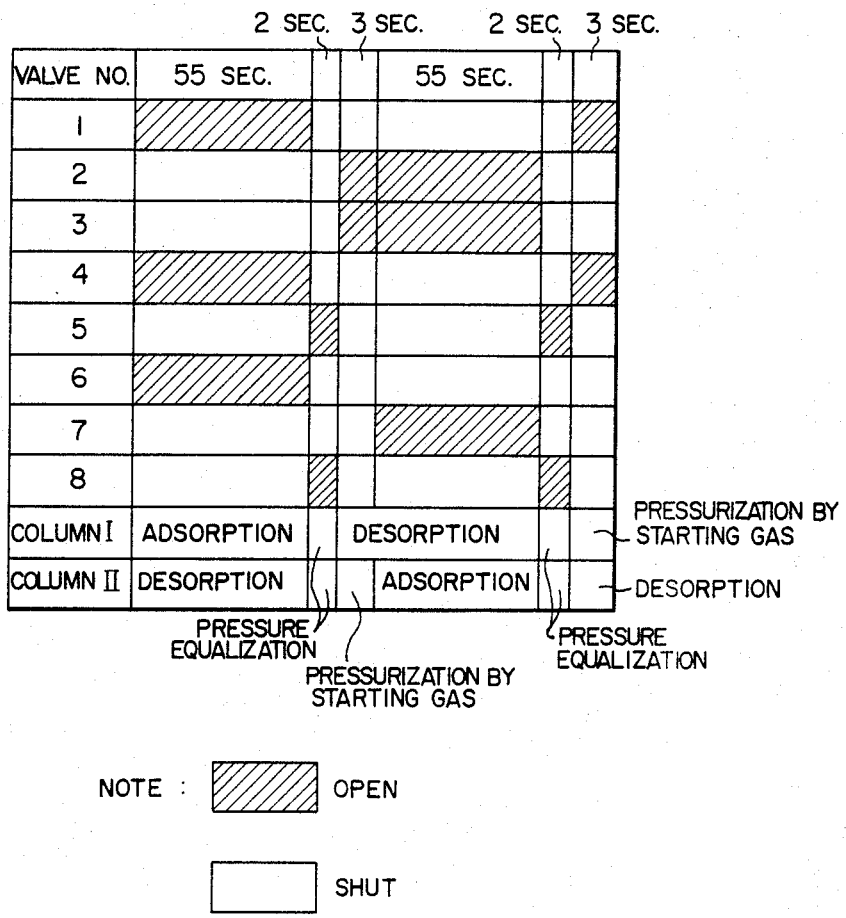
Figure 7:
Figure 7:
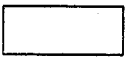

The first-stage to fifth-stage PSA apparatus were actually connected as shown in FIG. 3. PSA operation was conducted by adopting the sequences and time cycles as shown in FIGS. 4 to 7 which were different from those of Examples 1 to 4, whereby high concentration argon was continuously obtained from air. Particularly, a known sequence and a known time cycle were applied to the first-stage PSA apparatus. Each gadget in PSA apparatus is shown in FIG. 3. The dimensions of adsorption columns of each PSA apparatus are as shown in Table 3.

TABLE 3

| | |
|---|---|
| First-stage PSA apparatus | Three columns of 800 mm D × 1100 mm H |
| Second-stage PSA apparatus | Three columns of 200 mm D × 1100 mm H |
| Third-stage PSA apparatus | Two columns of 130 mm D × 1100 mm H |
| Fourth-stage PSA apparatus | Three columns of 80 mm D × 1100 mm H |
| Fifth-stage PSA apparatus | Three columns of 70 mm D × 1100 mm H |

The pressure, gas component and flow rate at each point are as shown in Table 4.

TABLE 4

| Point | Line No. | Gas | Pressure | Component $O_2$ | Ar | $N_2$ | Flow rate |
|---|---|---|---|---|---|---|---|
| Inlet of the first-stage apparatus | (1) | Air | 500 mm H$_2$O | 20.9% | 0.9% | 78.2% | 171 Nm$^3$/hr |
| Outlet of the first-stage apparatus | (2) | Crude oxygen gas | 200 mm H$_2$O | 90.0% | 4.35% | 5.65% | 17.9 Nm$^3$/hr |
| Desorbed gas from the first-stage apparatus | (3) | — | Min. 150 Torr | — | — | — | 153.1 Nm$^3$/hr |
| Inlet of the second-stage apparatus | (4) | — | Max. 2.5 kg/cm$^2$G | 87.4% | 5.5% | 7.1% | 19.9 Nm$^3$/hr |
| Desorbed gas from the second-stage apparatus | (5) | High conc. oxygen gas | Min. 150 Torr | 94.8% | 2.2% | 3.0% | 17.0 Nm$^3$/hr |
| Outlet of the second-stage apparatus | (6) | Primary argon gas | Max. 2.0 kg/cm$^2$G | 45.0% | 31.1% | 23.9% | 3.0 Nm$^3$/hr |
| Desorbed gas from the third-stage apparatus | (7) | — | Min. 100 Torr | — | — | — | 2.1 Nm$^3$/hr |
| Outlet of the third-stage apparatus | (8) | Secondary argon gas | Max. 0.7 kg/cm$^2$G | 2.0% | 42.8% | 55.2% | 0.9 Nm$^3$/hr |
| Inlet of the fourth-stage apparatus | (9) | — | Max. 0.6 kg/cm$^2$G | ND | 43.7% | 56.3% | 0.9 Nm$^3$/hr |
| Outlet of the fourth-stage apparatus | (10) | High conc. argon gas | Max. 0.4 kg/cm$^2$G | ND | 99.0% | 1.0% | 0.3 Nm$^3$/hr |
| Desorbed gas from the fourth-stage apparatus | (11) | — | Min. 100 Torr | ND | 36.1% | 63.9% | 0.9 Nm$^3$/hr |
| Outlet of the fifth-stage apparatus | (12) | Recovered argon gas | Max. 0.7 kg/cm$^2$G | ND | 81.5% | 18.5% | 0.3 Nm$^3$/hr |
| Desorbed gas from the fifth-stage apparatus | (13) | High conc. nitrogen gas | Min. 50 Torr | ND | 13.4% | 86.6% | 0.6 Nm$^3$/hr |

Note:
1. ND means is an abbreviation of Not Determined and refers to a concentration which cannot be detected by a zirconia type oxygen analyzer.
2. All the other data of the gas component are analytical values obtained by gas chromatography.

As shown in Table 4, argon in the outlet gas (2) of the first-stage PSA apparatus was enriched to 99% concentration, and was recovered with a 40% yield at the outlet (10) of the fourth-stage PSA apparatus. Oxygen of 90% concentration in the outlet gas (2) of the first-stage PSA apparatus was enriched to 94.8% concentration in line (5) and desorbed at the pressure of 150 Torr in the second-stage PSA apparatus. Further, a nitrogen gas of 86.6% concentration free from oxygen was obtained as the desorbed gas (13) from the fifth-stage PSA apparatus.

What is claimed is:

1. A process for selectively obtaining argon and oxygen from the starting gas comprising O$_2$ as the major component and at least 3% of argon by a pressure-swing-adsorption method, characterized by introducing the starting gas into a first adsorption apparatus containing three carbon molecular sieve-packed columns, subjecting said starting gas to pressure-swing-adsorption therein to obtain high purity O$_2$ and intermediate concentration Ar, subsequently introducing the intermediate concentration Ar into a second adsorption apparatus containing two carbon molecular sieve-packed columns, subjecting said intermediate concentration Ar to pressure-swing-adsorption therein, recycling the desorbed gas of the second adsorption apparatus to the inlet of the first adsorption apparatus, said pressure-swing-adsorption being conducted at an adsorption pressure of 0.3 to 10 kg/cm$^2$G and at a desorption pressure of not more than 760 Torr in the first and second adsorption apparatuses, whereby high concentration argon is obtained.

2. A process according to claim 1 wherein the concentrated argon obtained from the second adsorption apparatus is further subjected to pressure-swing-adsorption operation in a zeolite molecular sieve-packed adsorption apparatus to separate nitrogen, thereby obtaining high concentration argon.

3. A process according to claim 2 wherein the concentrated argon obtained from the second adsorption apparatus is passed through a de-oxygenation apparatus prior to sending it to the zeolite molecular sieve-packed adsorption apparatus in which hydrogen is added to obtain high concentration argon substantially free from oxygen.

4. A process according to claim 3 wherein the desorbed gas from the zeolite molecular sieve-packed adsorption apparatus is further subjected to pressure-swing-adsorption operation in a second zeolite molecular sieve-packed adsorption apparatus to recover argon, and the concentrated argon obtained is mixed with the starting gas at the inlet of the first zeolite molecular sieve-packed adsorption apparatus.

5. A process according to claim 1 wherein the concentrated argon is passed through a de-oxygenation apparatus in which hydrogen is added, thereby obtaining high concentration argon substantially free from oxygen, and this is sent to a low temperature liquefaction apparatus in which argon is liquefied to separate nitrogen, thereby obtaining high purity argon.

6. The process of claim 1 wherein said carbon molecular sieve has micro-pore diameter of 3 Å.

7. The process of claim 1 wherein the adsorption pressure is 1 to 3 kg/cm$^2$G.

8. The process of claim 1 wherein the desorption is operated at a pressure of 400 Torr or less.

9. The process of claim 1 wherein the desorption is operated at a pressure of 200 Torr or less.

* * * * *